(12) United States Patent
Patera

(10) Patent No.: US 6,302,354 B1
(45) Date of Patent: Oct. 16, 2001

(54) SPACE VEHICULAR FLY-BY GUIDANCE METHOD

(75) Inventor: Russell Paul Patera, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/591,387

(22) Filed: Jun. 7, 2000

(51) Int. Cl.[7] ................................. F41G 7/20; B64G 9/00
(52) U.S. Cl. .................... 244/3.15; 244/3.1; 244/158 R; 244/172
(58) Field of Search ..................... 244/3.1, 3.15, 244/3.16–3.22, 158 R, 158 A, 159–173; 342/118, 119, 175, 195, 61, 62; 318/560, 561; 701/200, 300, 301, 302

(56) References Cited

U.S. PATENT DOCUMENTS

| | | | | |
|---|---|---|---|---|
| 4,456,862 | * | 6/1984 | Yueh | 318/561 |
| 4,492,352 | * | 1/1985 | Yueh | 244/3.15 |
| 4,494,202 | * | 1/1985 | Yueh | 701/302 |
| 4,502,650 | * | 3/1985 | Yueh | 244/3.15 |
| 6,064,332 | * | 5/2000 | Cloutier | 342/62 |
| 6,116,545 | * | 9/2000 | Salvatore et al. | 244/158 R |
| 6,149,103 | * | 11/2000 | Salvatore et al. | 244/158 R |

OTHER PUBLICATIONS

"Spacecraft Trajectories: Lecture #9: You Can Get There From Here!", University of Wisconsin; Madison, Wisconsin; Feb. 8, 1999; posted on the Internet at the website at rigel.neep.wisc.edu.*

* cited by examiner

Primary Examiner—Bernarr E. Gregory
(74) Attorney, Agent, or Firm—Derrick Michael Reid

(57) ABSTRACT

A predictive guidance algorithm maneuvers a fly-by vehicle in a direction towards an object vehicle with a time varying line-of-sight rate. After initial predictive guidance, a modified proportional navigation maneuvering phase accelerates the fly-by vehicle towards an object vehicle on an intercept line-of-sight path. The proportion navigation maneuvering is terminated prior to interception so that the fly-by vehicle does not intercept the object vehicle, but rather flies by the object vehicle at a desired miss distance, well suited for fly-by monitoring and imaging missions of space vehicles and planetary objects.

10 Claims, 3 Drawing Sheets

FLY BY GUIDANCE ALGORITHM

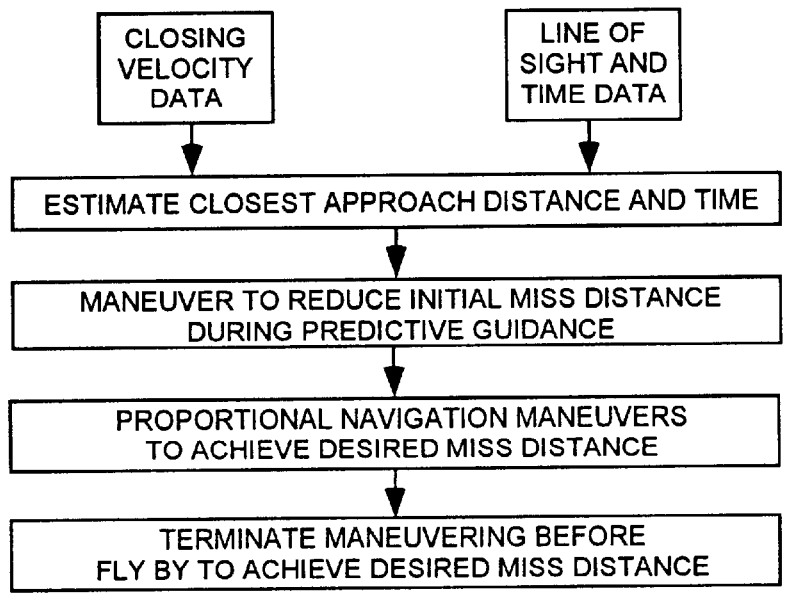
FIG.1 FLY BY GUIDANCE ALGORITHM
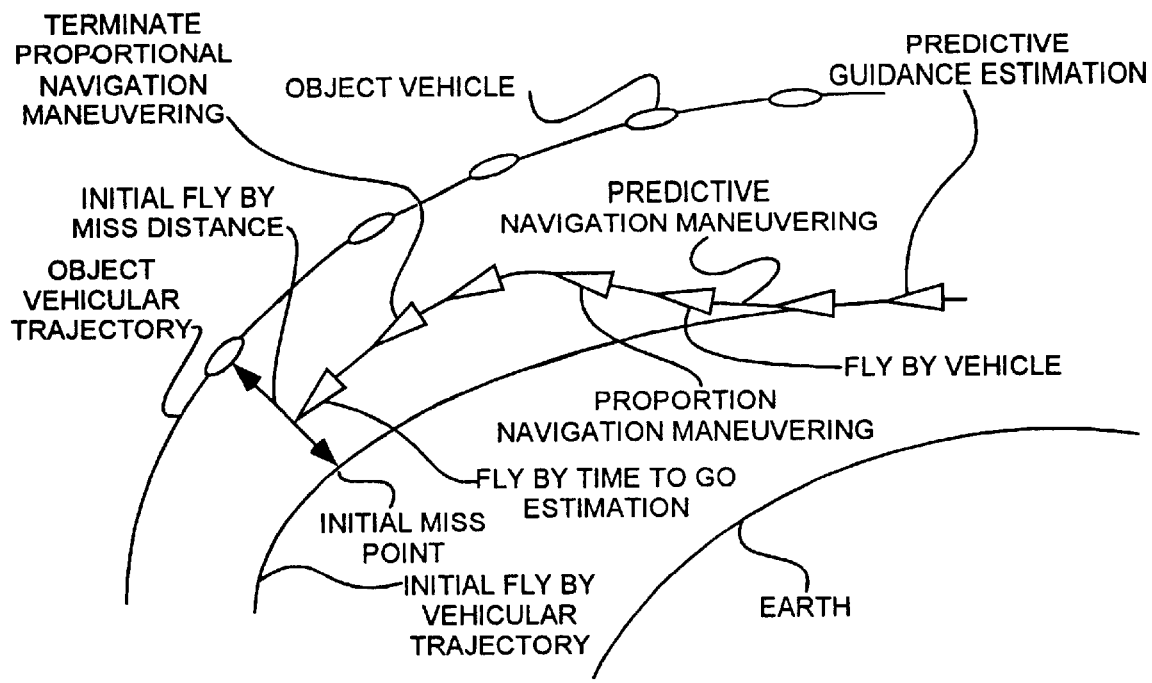
FIG. 2 FLY-BY ENCOUNTER SEQUENCE

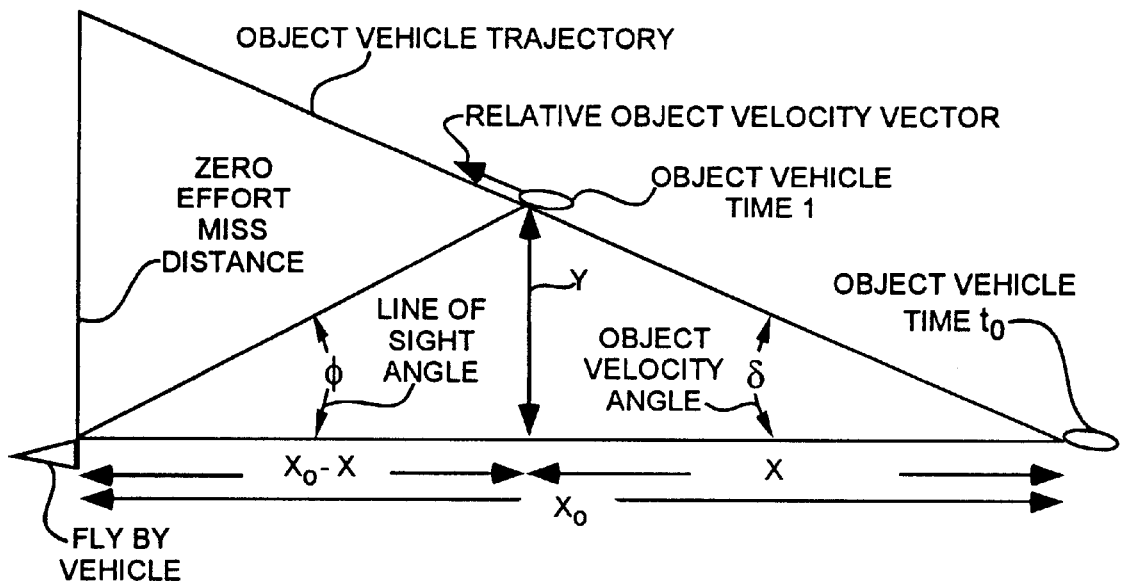
FIG. 3 OBJECT VEHICLE TRAJECTORY COORDINATE SYSTEM
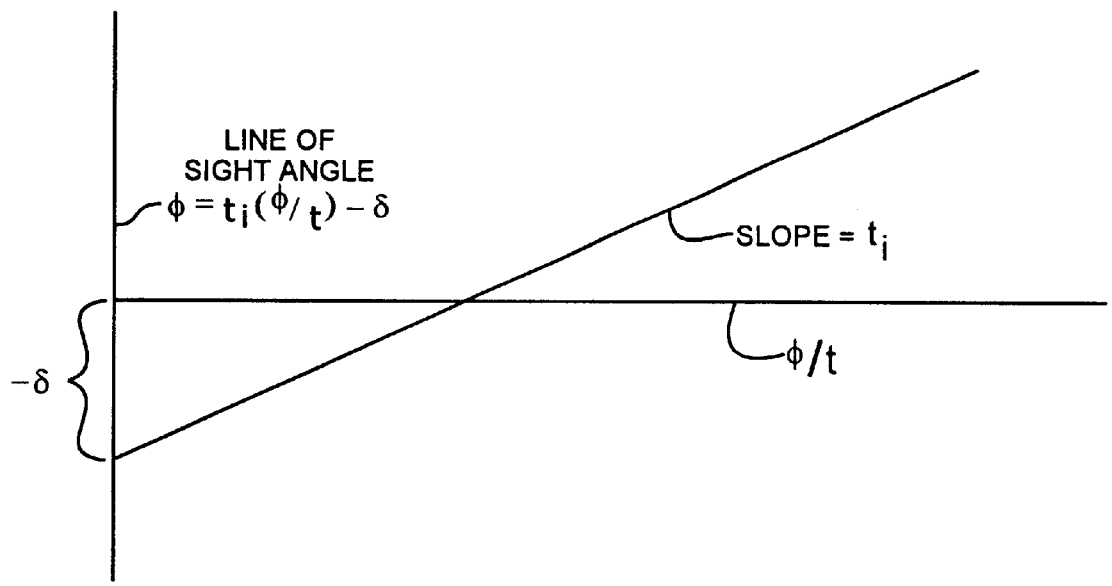
FIG. 4 LINE OF SIGHT ANGLE $\phi$ PLOT

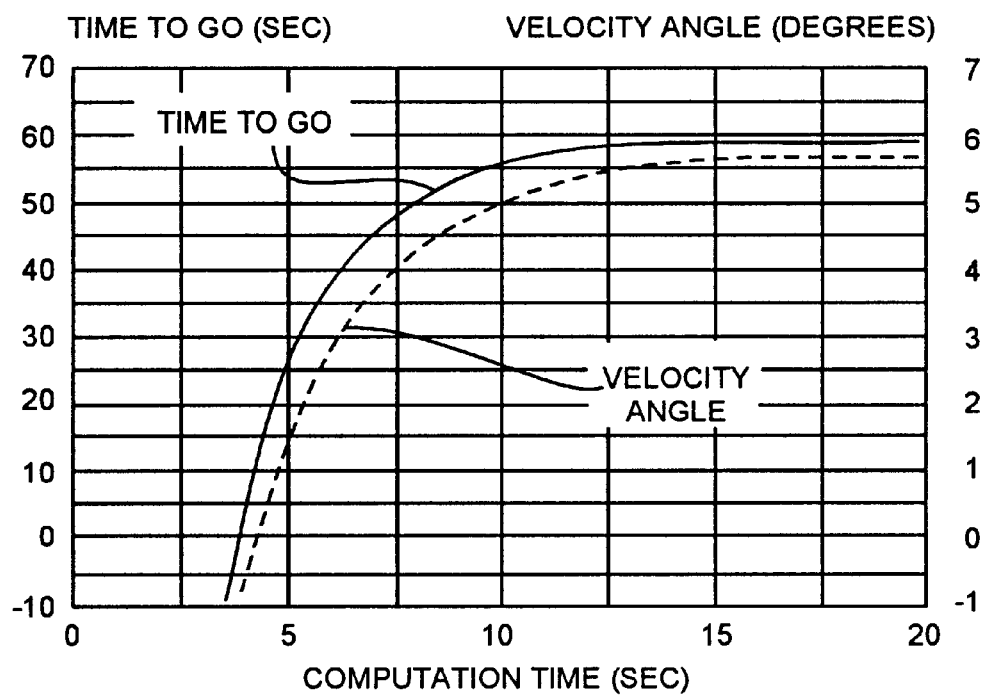
FIG. 5 ESTIMATION TIME GRAPH
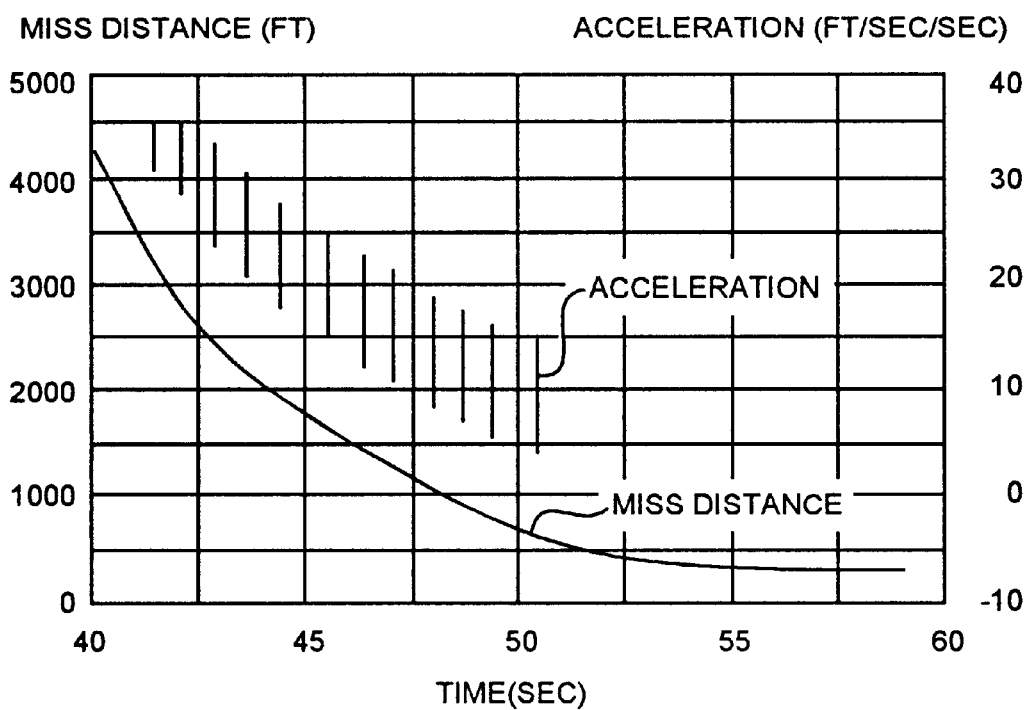
FIG. 6 MISS DISTANCE & ACCELERATION GRAPH

SPACE VEHICULAR FLY-BY GUIDANCE METHOD

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of space vehicular maneuvering and navigation. More particularly, the present invention relates to methods for maneuvering a fly-by space vehicle to fly-by in close proximity to an object space vehicle.

BACKGROUND OF THE INVENTION

Often it is desirable to have a space vehicle fly-by another space vehicle. A fly-by vehicle is required to approach and fly-by an object vehicle or planetary object at a predetermined close distance, without intercepting the vehicle or object. One example of this application is space object surveillance. To obtain a good resolution photograph of a satellite requires that the observation camera be close to the satellite. However, the fuel required to rendezvous with a satellite is costly due to the high orbital velocities involved. It is much easier to fly-by than rendezvous with a satellite. A fly-by guidance algorithm is necessary to insure that the proper close approach distance is achieved and that the space vehicles do not accidentally collide. Another application is a planetary or lunar fly-by of a space probe. The object could be any arbitrary space vehicle or planetary body. If the object vehicle or object is a satellite of a planetary body, both the fly-by vehicle and the object are acted upon by the gravitational force produced by the planetary body about which the fly-by vehicle and object move. When the object is a planetary body, the fly-by vehicle is typically placed on a fly-by trajectory that will cause the fly-by vehicle to fly-by the planetary body so as to use the gravitational force of the planetary body to alter the trajectory of the fly-by space vehicle towards the object. The fly-by approach is a gravity-assisted approach where gravity vectors guide the fly-by vehicle along the fly-by trajectory. The fly-by vehicle is maneuvered into the fly-by trajectory such that gravity vectors will then bring the fly-by vehicle into close proximity to the object vehicle or planet at the desired fly-by distance. For the fly-by mission, a fly-by guidance algorithm has been used at the start of the end phase approach to achieve the desired predetermined fly-by distance. The end phase of a fly-by mission to fly-by the object vehicle is when maneuvering occurs at the start of the end phase to place the fly-by vehicle on a fly-by trajectory under gravitational forces. Planetary fly-by missions have been achieved by remotely estimating the position and velocity state vectors of the fly-by vehicle relative to the planetary object and remotely commanding the fly-by vehicle to maneuver into the fly-by trajectory to achieve the desired fly-by distance. Due to the uncertainties in remotely computed navigational state vectors used to maneuver the fly-by vehicle into the initial fly-by trajectory, the achieved closest approach distance is often far greater than the desired predetermined fly-by distance.

The fly-by gravity assisted approach is different than an intercepting approach such as with a kinetic kill vehicle used to collide with and destroy a target vehicle. The kinetic kill vehicle has an optical sensor for determining a line-of-sight to the target vehicle. The kinetic kill vehicle uses the line-of-sight information in a guidance algorithm to maneuver the kinetic kill vehicle into and along a collision intercept trajectory for colliding with the target vehicle. In the kinetic kill mission, the end phase guidance uses either a continuous or discrete proportional navigation algorithm to maneuver the kinetic kill vehicle onto the intercept trajectory directly towards the target vehicle. The end phase maneuvering is applied to the interceptor vehicle to achieve interception along the line-of-sight trajectory. The line-of-sight sensor is placed on the interceptor to measure the line-of-sight angle as well as the angle rate to the target vehicle used during end phase navigation. Hence, the interceptor requires on-board navigation and guidance using line-of-sight rate data. The line-of-sight sensor and guidance system on the interceptor is used to obtain navigation data to maneuver the interceptor directly towards the target vehicle. Data from the line-of-sight sensor is processed and used to develop proportional navigation maneuvering commands applied to the propulsion system of the interceptor so as to cause a collision with the target vehicle at an effective zero miss distance.

The continuous and discrete proportional navigation algorithms can perform the intercept mission. Proportional navigation maneuvering provides acceleration of the interceptor that is proportional to the line-of-sight angular rate relative between the interceptor and target vehicles. The proportional navigation algorithm is not fuel-efficient because it causes excessive maneuvering during the end phase. Predictive guidance algorithms that predict the future positions of the target vehicle could be used to improve fuel economy by reducing excessive maneuvering during the end phase. The continuous and discrete proportional navigation algorithms use noisy line-of-sight data generated from uncertainties in the sensor and electronics and hence require continuous excessive maneuvering during the end phase. Proportional navigation is designed specifically to guide the interceptor into the target vehicle. Proportional navigation has not been used to achieve a required fly-by distance during a fly-by mission because the proportional navigation algorithm is based upon line-of-sight navigation directly towards the target vehicle. Prior fly-by guidance algorithms do not use line-of-sight sensors for navigation and guidance, and hence, have not used continuous nor discrete proportional navigation. As such, fly-by missions do not have an end phase internal navigation capability that might otherwise provide accurate fly-by distances and fuel-efficient fly-by missions. These and other disadvantages are solved or reduced using the invention.

SUMMARY OF THE INVENTION

An object of the invention is to provide a method for flying by an object vehicle in space at a predetermined fly-by distance.

Another object of the invention is to provide a method for flying by an object vehicle in space at a predetermined fly-by distance using proportional navigation.

Another object of the invention is to provide segmented navigation including predictive navigation for maneuvering a fly-by vehicle into an initial trajectory to achieve a non-zero line-of-sight rate relative between an object to be flown by and the fly-vehicle, including proportional navigation for fuel efficient end phase maneuvering for maneuvering the fly-by vehicle towards the object, and including a termination phase for providing a termination fly-by trajectory of the fly-by vehicle flying by the object at the desired miss fly-by distance.

The present invention is a method providing a fly-by guidance algorithm that enables accurate maneuvering of a fly-by vehicle to achieve a desired fly-by distance from an object in space during a fly-by mission. The fly-by guidance algorithm receives closing velocity data as a velocity vector that indicates the direction and speed at which the object and fly-by vehicle are approaching each other. The fly-by guidance algorithm also receives time data from an on-board clock and angular line-of-sight data from an on-board line-of-sight sensor for generating angular line-of-sight rate data. A line-of-sight sensor is placed on the fly-by vehicle to measure the line-of-sight angle to the object vehicle. The line-of-sight sensor and guidance system on the fly-by vehicle are used to obtain the required fly-by distance. Data from the line-of-sight sensor is processed and used to develop maneuvering commands applied to the fly-by vehicle so as to achieve the fly-by distance with fuel-efficient end phase maneuvering.

When the fly-by vehicle is at a distal position from the object vehicle, the fly-by guidance algorithm uses predictive guidance to estimate the approach time and distance to the object vehicle, and maneuvers during a predictive guidance phase the fly-by vehicle to achieve an initial miss distance that may be different than the desired miss fly-by distance. The initial miss distance may be different than the desired miss distance so that the line-of-sight angular rate is not zero. The non-zero line-of-sight rate is needed for the continuous proportional navigation guidance. The fly-by guidance algorithm then uses continuous proportional navigation to guide the fly-by vehicle towards the object vehicle on an intercept line-of-sight trajectory. Interception might otherwise occur when the fly-by vehicle is maneuvered continuously towards the object vehicle using the continuous proportional navigation algorithm. At a predetermined proximal distance from the object vehicle and at a corresponding time-to-go fly-by or interception, the proportional navigation is terminated as the object vehicle continues along an object vehicle trajectory and as the fly-by vehicle then continues along the fly-by trajectory, resulting in a fly-by of the object vehicle at the desired miss fly-by distance.

During the fly-by mission, instead of colliding with the object vehicle, the fly-by vehicle is effectively commanded to maneuver and fly-by the object vehicle at the predetermined miss fly-by distance. To accurately achieve the desired fly-by distance, the end phase of the fly-by mission is segmented into the predictive guidance phase, the proportional navigation phase, and the termination phase. Initially, a state position and velocity vector of the object vehicle is remotely estimated and communicated to the fly-by vehicle, and the fly-by vehicle then maneuvers onto an initial trajectory. The state position and velocity vector of the object vehicle is estimated based on data that may be obtained from remote tracking sensors independent of the fly-by vehicle. After initial predictive maneuvering, the fly-by vehicle enters proportional navigation for fuel-efficient maneuvering along an intercept trajectory. A sequence of line-of-sight measurements is processed during proportional navigational guidance. After the navigational guidance is terminated, the fly-by vehicle then proceeds along the fly-by trajectory to fly-by the object vehicle. The resulting miss fly-by distance is accurate and has end phase maneuvering applied to the fly-by vehicle to fuel-efficiently achieve the desired fly-by distance.

The fly-by guidance algorithm can perform a kinetic kill mission as well as a fly-by mission, the difference being that the required miss distance during a kinetic kill mission is set to zero, and the termination phase would not be used. The fly-by guidance algorithm is fuel efficient because it uses a predictive fly-by algorithm at a distal location to minimize excessive maneuvering during the proportional navigation phase, and because it uses proportional navigation during the end phase. The predictive guidance algorithm preferably uses conventional recursive time and distance estimations for estimating the time-to-go and the distance to the object. The time and distance estimator filters noise from line-of-sight data to provide accurate time and distance estimations. The time and distance estimations of the predictive fly-by guidance algorithm are used to determine the time at which proportional navigational maneuvering is terminated. Once the proportional navigation maneuvering ceases, the predictive fly-by guidance algorithm can use line-of-sight data to more accurately estimate the time-to-go to the fly-by time and to more accurately estimate the fly-by distance at the time of fly-by. The estimated time-to-go to the fly-by time can be used for activating other on-board electronics and sensors, such as photographic, monitoring and imaging systems where object monitoring and imaging is desired. The fly-by guidance algorithm does not rely solely upon imprecise and uncertain planetary gravity vectors but rather uses proportional navigation to achieve accurate desired fly-by distances. The fly-by guidance system can also be used in earth orbit or in high altitude atmosphere surrounding the earth.

The proportional navigation algorithm is modified by termination so as to terminate the proportional navigation maneuvering so that the fly-by vehicle no longer continues on an intercept course, but rather, the proportional navigation maneuvering is terminated so that the object vehicle is missed. The precise time of proportional navigation termination in view of the relative velocity vector produces the desired fly-by distance. These and other advantages will become more apparent from the following detailed description of the preferred embodiment.

BRIEF DESCRIPTION OF THE DRAWINGS

FIG. 1 is a block diagram of the fly-by guidance algorithm.

FIG. 2 depicts trajectories of the fly-by vehicle and the object vehicle.

FIG. 3 depicts a coordinate system between the fly-by vehicle and the object vehicle.

FIG. 4 is a line-of-sight plot.

FIG. 5 is an estimation time graph.

FIG. 6 is a miss distance and acceleration graph.

DETAILED DESCRIPTION OF THE PREFERRED EMBODIMENT

An embodiment of the invention is described with reference to the figures using reference designations as shown in the figures. Referring to FIGS. 1 and 2, the fly-by guidance algorithm is executed during an end phase of a fly-by mission. The fly-by vehicle includes a conventional clock, line-of-sight sensor, propulsion system, attitude control system and navigation system, as are well known, and not shown, and has received, apriori, closing velocity data such as a relative velocity vector that is the difference between the velocity vector of the fly-by vehicle and the velocity vector of the object vehicle. The guidance algorithm requires that the fly-by vehicle and object vehicle have a known relative range rate that may be a constant value and that the guidance line-of-sight sensor provides sequential line-of-sight data while the clock provides sequential time measurements.

The object vehicle is initially and continuously tracking along an object vehicular trajectory. The fly-by vehicle is initially tracking along an arbitrary trajectory. The arbitrary trajectory is such that the line-of-sight sensor on the fly-by vehicle can acquire the object vehicle with a field of view of the fly-by vehicle. The fly-by guidance algorithm begins operation after the object vehicle is acquired by the line-of-sight sensor. Upon activation of the fly-by guidance algorithm, at a distal position from the object vehicle, the fly-by vehicle enters into a predictive guidance phase. The fly-by guidance algorithm initially uses predictive guidance to estimate the closest approach distance and the corresponding time when the fly-by vehicle will fly-by the object vehicle. The fly-by vehicle obtains line-of-sight data specifying the relative direction of the object vehicle. During the predictive guidance phase, line-of-sight acquisition is continuous. During the predictive guidance phase, the fly-by vehicle uses predictive guidance maneuvering to maneuver the fly-by vehicle towards the object vehicle so as to move along an initial trajectory providing an initial fly-by miss distance at an initial fly-by time. The predictive guidance algorithm provides for a non-intercepting trajectory so that the line-of-sight rate between the object vehicle and the fly-by vehicle is not equal to zero. After the predictive guidance maneuvering, the fly-by vehicle then enters a proportional navigation phase. During the proportional navigation phase, the fly-by vehicle maneuvers on an intercept trajectory towards the object vehicle using proportional navigation.

The line-of-sight rate data is used during proportional navigation to maneuver the fly-by vehicle towards the object vehicle. At a predetermined time or proximal distance from the object vehicle, the fly-by vehicle terminates the proportional navigation maneuvering so as to no longer be maneuvering along the intercept trajectory. The fly-by vehicle then estimates the fly-by time and the fly-by miss distance, as the object vehicle continues along the object vehicle trajectory, resulting in a miss and not an interception. The proportional navigation is modified by this termination of the proportional navigation maneuvering to avoid an interception where the miss distance is greater than zero. During the termination phase, the time-to-go and fly-by distances are continuously estimated. The time-to-go estimation to fly-by can be used to activate on-board electronics for monitoring or imaging the object vehicle. The time of fly-by and fly-by distance can be used to also activate communication receivers on the fly-by vehicle used to obtain data from the object vehicle. The estimated fly-by miss distance can be used to focus fly-by vehicle sensors so as to obtain desired data of the object vehicle. After predictive and proportional navigation maneuvering, the fly-by vehicle continues to move along a fly-by trajectory in a direction towards the object vehicle that is still moving along the object vehicle trajectory. The fly-by trajectory and object vehicle trajectory defines the desired and to be achieved fly-by distance.

The fly-by guidance algorithm is used during an end phase that consists of three phases, the predictive guidance phase, the modified proportional navigation phase, and the termination fly-by phase. The predictive guidance phase is used to estimate the time-to-go, and an arbitrary fly-by miss distance $M_o$ at closest approach was moving along an arbitrary trajectory. A predictive guidance maneuver is applied to the fly-by vehicle to place the fly-by vehicle into the initial trajectory prior to the proportional navigation phase. The initial trajectory is initialized by maneuvering the fly-by vehicle so as to provide the initial miss distance $M_I$ at fly-by. Under some circumstances, the predictive guidance maneuvering may be sufficient to accomplish the desired fly-by mission, without proportional navigation. After the predictive guidance phase is completed, the modified proportional navigation phase begins. The predictive guidance algorithm may determine the termination time of the proportional navigation phase. The modified proportional navigation algorithm is initialized using the estimated time-to-go and the initial miss distance $M_I$. The modified proportional navigation maneuvering is stopped at the termination time $t_s$ that occurs prior to fly-by at a proximal position from the object vehicle. The termination time $t_s$ can be computed by the modified proportional navigation algorithm. During the navigation phase and termination phase before fly-by, the predictive guidance algorithm is employed to estimate the time of fly-by and the fly-by distance.

The end phase begins with the fly-by vehicle on the arbitrary but near fly-by trajectory. In a reference frame fixed with the fly-by vehicle, the object vehicle moves at nearly a constant velocity. Parameter relationships can be illustrated in a plane containing the line-of-sight vector and a relative object velocity vector that is a relative closing velocity $V_c$. Because the fly-by vehicle and object vehicle are located at different points, gravitational forces are slightly different. Only these differential gravitational forces produce a relative acceleration that diminishes as the separation distance between the fly-by and object vehicles decreases. The end phase of a planetary body fly-by will typically begin with the fly-by vehicle on a near fly-by trajectory. Because the relative closing velocity is much larger than velocity changes produced by the planetary gravitational field during the time that predictive guidance estimations are made, the closing velocity is nearly constant and the predictive guidance algorithm provides accurate maneuvering.

Referring to all of the figures, and more particularly to FIGS. 3 and 4, the relative trajectory of the object vehicle is shown relative to the line-of-sight angle $\phi$ of the fly-by. The line-of-sight angle $\phi$ is used in the end phase analysis and can be defined as the angle between the current line-of-sight from the fly-by vehicle to the object vehicle and the initial line-of-sight at acquisition. Assuming the relative acceleration between the fly-by vehicle and the object vehicle is zero, a linear relationship exists between $\phi$ and $\phi/t$ for a small line-of-sight $\phi$, such that $\phi = t_i(\phi/t) - \delta$, where $t_i$ is the time at fly-by, $t$ is the current time, $\phi$ is the line-of-sight angle and $\delta$ is the angle of the relative velocity vector of the object vehicle with respect to the fly-by vehicle as measured from the initial line-of-sight at acquisition. The current time $t$ is the current time measured from $t=0$ at time of line-of-sight acquisition. At $t=0$, $\phi=0$. Sequential data, $(\phi, t)$ can be processed recursively to obtain the slope, $t_i$ and the relative velocity angle $\delta$. Once the recursive filter converges, a zero effort miss distance $M_o$, the time-to-go $T_{go}$, a null Velocity $\Delta V_{null}$ that is a change in the velocity of the fly-by vehicle required to null the zero effort miss distance, and a modified velocity $\Delta V_{mod}$ which is a change in velocity required to reduce the zero effort miss distance to the initial miss distance $M_I$ as required for the modified proportional navigation algorithm can be obtained.

The time-to-go $T_{go}$ is equal to fly-by-time $t_i$ minus the current $t$, that is, $T_{go} = t_i - t$. The zero effort miss distance $M_o$ is equal to the product of the fly-by time, the closing velocity $V_c$ and the object velocity angle $\delta$, that is, $M_o = t_i V_c \delta$. The null velocity $\Delta V_{null}$ is equal to the zero effort miss distance $M_o$ divided by the time to go $T_{go}$, that is, $\Delta V_{null} = M_o / T_{go}$. The modified velocity $\Delta V_{mod}$ is a change in velocity of the fly-by-vehicle and is equal to the difference between the zero effort miss distance $M_o$ and the initial miss distance $M_I$ divided by the time to go $T_{go}$, that is $\Delta V_{mod}=(M_o-M_I)/T_{go}$. The modified velocity $\Delta V_{mod}$ is the velocity applied to the fly-by vehicle just prior to initiating the proportional navigation phase.

At the end of the predictive guidance phase, a velocity increment of magnitude of the modified velocity $\Delta V_{mod}$ is added to the fly-by vehicle in preparation for the modified proportional navigation phase. The modified velocity $\Delta V_{mod}$ is an incremental change in the velocity of the fly-by vehicle that is applied upon the initiation of the proportional navigation at time $T_{mod}$. The direction of the modified velocity $\Delta V_{mod}$ is perpendicular to the line-of-sight vector and is in a direction so as to reduce the closest approach distance to the initial fly-by distance. After $\Delta V_{mod}$ is applied to the fly-by vehicle, the fly-by miss distance is $M_I$. After applying the $\Delta V_{mod}$ to the fly-by vehicle, the modified proportional navigation phase is initiated.

Modified proportional navigation can be implemented to correct for errors during the end phase. The line-of-sight rate, that is, the time rate of change of the line-of-sight angle is used to determine the acceleration during proportional navigation maneuvering of the fly-by vehicle. The proportional navigation maneuvering imparts an acceleration A, upon the fly-by vehicle that is equal to a product of a navigational constant C, the closing velocity $V_c$, and the line-of-sight rate $d\phi/dt$, that is, $A=CV_c(d\phi/dt)$. The navigation constant C is a predetermined constant used for a particular fly-by mission. The closing velocity $V_c$ is the relative range rate between the fly-by and object vehicles. The proportional navigation maneuvering acceleration A is applied in a direction so as to reduce the initial miss distance $M_I$ to equal the desired miss distance $M_D$. The desired miss distance $M_D$ is a predetermine distance. The modified time $T_{mod}$ is the time of initiation of modified proportional navigation. The modified proportional navigation duration $\Delta T_{mod}$ is from the initiation at time $T_{mod}$ of the modified proportional navigation to the current time t minus $T_{mod}$, that is, $\Delta T_{mod}=t-T_{mod}$. The current miss distance $M_{AT}$ is the miss distance that would occur without any further maneuvering. The current miss distance $M_{AT}$ is a function initial miss distance $M_I$, the modified proportional navigation duration $\Delta T_{mod}$, the current time t, the fly-by time $t_i$, and the time of initiating the modified proportional navigation $T_{mod}$, and the navigation constant C, such that, $M_A=M_I[1-\Delta T_{mod}/(t_i-T_{mod})]^c$. The current miss distance $M_{AT}$ is a function of time from the start of the modified proportional navigation phase. The desired miss distance $M_D$ is obtained by terminating the modified proportional navigation maneuvers at the termination stop time $t_s$ where $t_s=T_{mod}+(t_i-T_{mod})[1-(M_D/M_I)^{1/c}]$. When the desired miss distance $M_D$ is set to zero, $t_s$ is equal to $t_i$ and the modified proportional navigation maneuvering will continue until intercept.

Referring to all of the figures, and more particularly FIGS. 5 and 6, the fly-by guidance algorithm can be implemented in conventional on-board navigation computers. In simulation, the predictive guidance estimator converged in about 15 seconds and predicted the fly-by time $t_i$ to be about 60 seconds. The object velocity angle $\delta$ is estimated to be about 5.7 degrees. The predictive guidance estimator converges well before the predicted fly-by time. The modified proportional navigation maneuvering terminates before the fly-by to guarantee the required miss at the desired miss distance $M_D$. The applied acceleration in ft/sec/sec and the current miss distance $M_{AT}$ can be plotted as a function of time during the modified proportional navigation phase. The acceleration results from modified proportional navigation maneuvering. The acceleration varies because noise in the line-of-sight sensor data is not filtered. A smoothing filter could be added to reduce fluctuation in the maneuvering and resulting acceleration. Filtering of the line-of-sight date would result in improved fuel efficiency during proportional navigation maneuvering. The fly-by distance decreases as expected until the modified predictive navigation maneuvering is terminated at time $t_s$ prior to fly-by.

The predictive guidance algorithm uses line-of-sight data to predict time-to-go and the miss distance. Terminating the proportional navigation guidance maneuvering at a specific termination time achieves the desired miss distance. The predictive guidance estimator predicts the time-to-go and miss distance after both predictive guidance and modified proportional navigation guidance. Navigation accuracy for deep space probes could be greatly improved by using the line-of-sight predictive guidance algorithm to predict closest approach distance and making corrective maneuvers during the end phase. The fly-by guidance algorithm offers accurate fly-by distances and times, and can be used for acquiring asteroid, cometary, planetary or lunar measurements during fly-by missions using gravitational assistance. Those skilled in the art can make enhancements, improvements, and modifications to the invention, and these enhancements, improvements, and modifications nonetheless fall within the spirit and scope of the following claims.

What is claimed is:

1. A method for flying by an object in space at a fly-by distance by a fly-by vehicle, the object having an object trajectory, the method comprising the steps of, receiving line-of-sight data indicating the direction of object vehicle relative to the fly-by vehicle, receiving closing velocity data indicating a relative velocity between the object and the fly-by vehicle, predictive estimating at a distal position a closest approach distance and time from the line-of-sight data and the closing velocity data, the estimating occurring when the fly-by vehicle is at a distal position from the object, predictive maneuvering the fly-by vehicle onto an initial trajectory along which the fly-by vehicle would miss the object at an initial miss distance and initial fly-by time, the predictive maneuvering providing a non-zero line-of-sight angular rate relative to the object, navigational maneuvering the fly-by vehicle towards the object on an intercept trajectory using the non-zero line-of-sight angle rate, and terminating the navigational maneuvering at a termination time prior to interception and prior to flying by the object when the fly-by vehicle is at a proximal position from the object, the fly-by vehicle continuing along a fly-by trajectory from the distal position towards the object concurrently continuing along the object trajectory, the fly-by trajectory and object trajectory defining the miss distance at a fly-by time.

2. The method of claim 1 further comprising the step determining a time-to-go during predictive maneuvering, the time-to-go is a difference between a current time and the fly-by time, the predictive maneuvering and the navigational maneuvering maneuvers the fly-by vehicle to fly-by the object to achieve the miss distance at the fly-by time.

3. The method of claim 1 wherein the navigation maneuvering step is a proportional navigation maneuvering step, the proportional navigation maneuvering the fly-by by providing acceleration of the fly-by vehicle that is proportional to the line-of-sight angular rate.

4. The method of claim 1 further comprising the step,
monitoring the object during fly-by, the monitoring occurring at a time-to-go amount of time after determining the time-to-go so as to monitor the object at the fly-by distance and at the fly-by time.

5. The method of claim 1 wherein the object is a planetary object.

6. The method of claim 1 wherein the object is a space vehicle.

7. The method of claim 1 wherein the initial miss distance is greater than the fly-by distance so that the angular line-of-sight rate is not zero.

8. The method of claim 1 wherein, the space is high altitude atmospheric space surrounding earth.

9. The method of claim 1 further comprising the step of, determining an updated fly-by distance and an updated time-to-go after the termination of the navigational maneuvering.

10. The method of claim 9 further comprising the step, monitoring the object during fly-by, the monitoring occurring at a time-to-go amount of time after determining the time-to-go so as to monitor the object at the fly-by distance and at the fly-by time.

* * * * *